Feb. 22, 1949.                F. R. FARROW, JR                2,462,622
                       MOUNTING MEANS FOR VACUUM TUBES
                            Filed Sept. 4, 1946

INVENTOR.
FREDERICK R. FARROW JR.
BY
Brown, Denk & Lynnestvedt
AGENTS

Patented Feb. 22, 1949

2,462,622

UNITED STATES PATENT OFFICE 2,462,622

MOUNTING MEANS FOR VACUUM TUBES

Frederick R. Farrow, Jr., Audubon, N. J., assignor to Philco Corporation, Philadelphia, Pa., a corporation of Pennsylvania Application September 4, 1946, Serial No. 694,757

9 Claims. (Cl. 248—361)

The present invention relates to mounting means and particularly to means for mounting vacuum tubes. More specifically, the invention has to do with an improved arrangement for rigidly mounting vacuum tubes of the so-called subminiature variety.

In tubes of this type, supporting structures such as prong bases, or the like, are eliminated and leads are brought out through metal-to-glass seals made directly in the tube envelope. Such tubes are generally used in small electronic apparatus such as pocket radios, hearing aids, testing devices, etc. However, mounting of such tubes in apparatus of the kind mentioned, has heretofore been a serious problem because of the restricted space available to mount the tubes and because of the absence of a rigid supporting structure on the tubes themselves. Consequently, it has been the customary practice to depend mainly upon the leads of the tubes to support the same, but this mode of support is most inadequate, particularly because it lacks the ability to hold the tubes with such rigidity as to prevent their subjection to vibrations which may deleteriously effect their operating characteristics.

It is therefore the primary object of this invention to provide an arrangement which overcomes the difficulties usually encountered in mounting a subminiature vacuum tube in a restricted space and which assures rigid retention of the tube when mounted in such a space.

Another object of the invention is to provide a tube mounting arrangement including means which can be easily associated with the framework of the electronic apparatus and with which tubes of the type above-identified can be readily engaged. Such an arrangement not only facilitates manufacturing and assembly of the apparatus but further insures protection of the tubes against excessive vibration during normal usage and operation.

Still another and more specific object of the invention resides in the provision of an arrangement utilizing an improved clamping device readily mountable in cooperative relation with the structure of the electronic apparatus and adapted for snug and rigid engagement with the envelope of a vacuum tube. By providing such a device the leads of the tube no longer serve as the main means of support, but the tube is rigidly held in fixed position due to the positive clamping engagement of the device with the tube envelope.

These and other objects, and the manner in which they are attained, will appear from the following description based on the accompanying drawing which illustrates a preferred embodiment of the invention.

Figure 1:
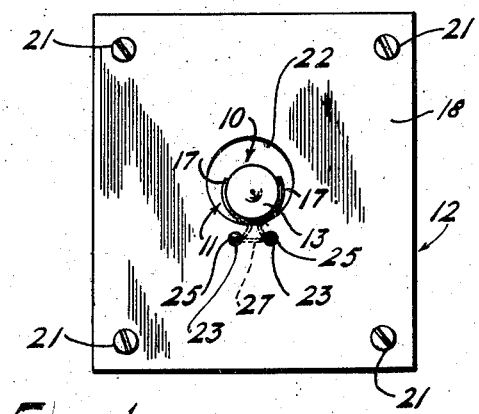
Figure 1 is a face elevational view of a tube mounting arrangement constructed in accordance with the invention.
Figure 2:
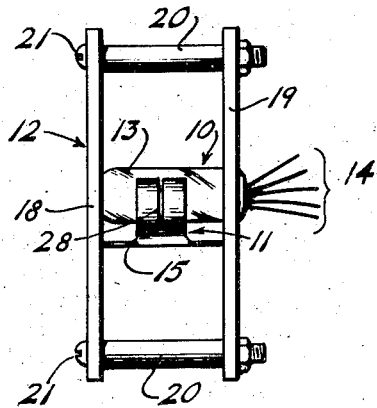
Figure 2 is a side elevational view of the same.

Referring more particularly to the drawing, Figures 1 and 2 show a vacuum tube 10 supported by means of a clamping device 11 in a framework 12. As shown, the tube 10 is of the so-called subminiature type. It includes a sealed envelope 13 of glass or other suitable material enclosing the usual electrodes (not shown) to which leads 14 (Figure 2) are connected. These leads extend directly out of the envelope through metal-to-glass seals as is customary in tubes of this kind.

Figure 3:
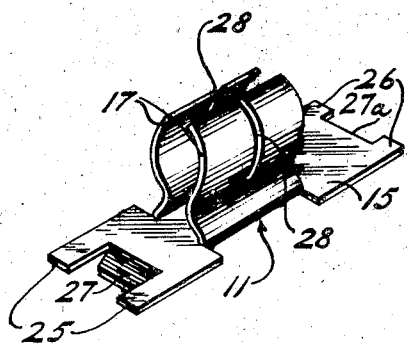
Figure 3 is a perspective view, on an enlarged scale, illustrating the construction of the clamping device utilized in the arrangement shown in Figures 1 and 2.

The clamping device, as is more clearly illustrated in Figure 3, comprises a base portion 15 and a tube-engaging portion, the latter consisting of confronting yieldable extensions 17 disposed to project from the sides and beyond one face of said base portion in a generally perpendicular plane with respect thereto. In the construction shown, extensions 17 are made to conform to the general configuration of the tube envelope 13 so that, in use, the extensions snugly receive and embrace said envelope in the manner particularly shown in Figures 1 and 2.

The framework 12 is adapted to provide the skeleton structure on and about which the electrical circuits and component parts, including one or more tubes similar to that shown at 10, are to be arranged in building up the electronic apparatus. This framework essentially comprises confronting wall portions which, as more clearly seen in Figure 2, consist of a pair of panels 18 and 19 conveniently disposed and maintained in spaced and substantially parallel relationship by means of spacers 20 and suitable fastening elements 21. These panels are advantageously constructed of suitable light but rigid material such as "Bakelite" or similar material.

In accordance with the present invention, at least one, and preferably each of the panels, is provided with means in the form of an opening 22 at the place where a tube is to be mounted, whereby installation of the clamping device between the panels and subsequent mounting of the tube may be readily accomplished in the manner hereinafter described. Also, in accordance with the invention, cooperative means are provided between the framework and the clamping device in order to retain said device in fixed position and to support the tube engaging portion thereof in alignment with said openings 22. For that purpose, the panels are each provided with a pair of restricted apertures 23 and 24, respectively, and the ends of the base portion 15 of said clamping device are each provided with a pair of longitudinally extended fingers 25 and 26, respectively. These apertures and fingers are so disposed with respect to each other, that each finger registers with and fits within a corresponding aperture. Moreover, a tongue 27 is provided between the fingers 25 at one end of said base portion. As particularly shown in Figure 1, this tongue is adapted to bear against the panel portion between the apertures into which said fingers 25 are fitted so that the marginal edge 27a (Figure 3), located at the other end of the base portion and disposed between the fingers 26, is forced into abutting engagement with the panel portion between the apertures into which said fingers 26 are engaged (see Figure 6). In this manner, a positive lock between the framework and the tube clamping device is obtained.

Figure 4:
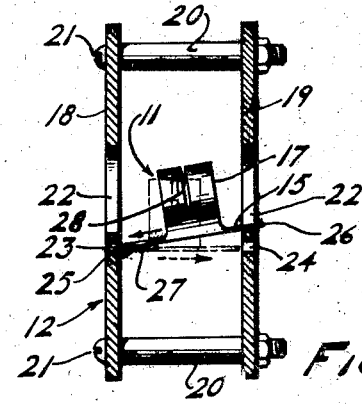
Figures 4, 5 and 6 are explanatory views, in vertical cross section, illustrating the mode of mounting the clamping device and of engaging a tube therewith.
Figure 5:
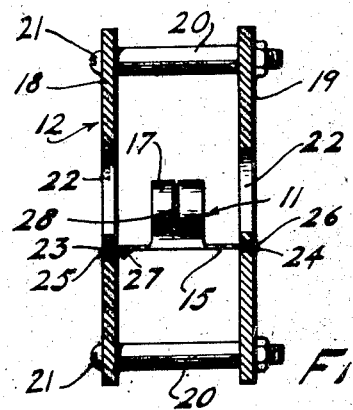
Figure 6:
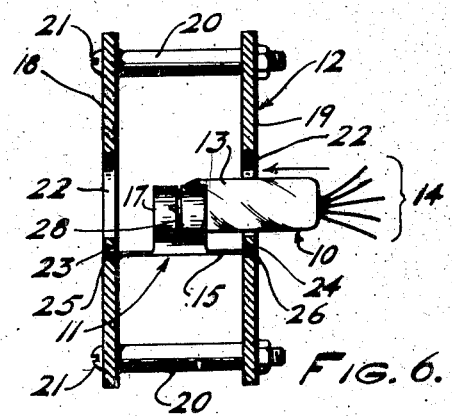

A convenient manner of installing the tube clamping device 11 and of mounting the tube 10 is illustrated in Figures 4, 5 and 6. As shown in full lines in Figure 4, the clamping device is conveniently introduced between the panels of the framework through the opening in one of said panels, for instance panel 19, so that the fingers between which the tongue 27 is located are guided, as represented by the solid arrow, into engagement with the corresponding apertures 23 in the other panel 18. The clamping device is then moved further inwardly of the framework until the remaining fingers 26 clear panel 19 so that the device may assume a position approximately as indicated in broken lines in Figure 4. In order to provide the necessary clearance, the tongue 27 is normally disposed at an angle with respect to the plane of the fingers and base portion of the clamping device.

From the position illustrated in broken lines in Figure 4, the clamping device is moved in the direction of panel 19 as represented by the broken arrow (Figure 4) to bring said remaining fingers 26 into engagement with the corresponding apertures in panel 19 as shown in Figure 5. The tongue 27 is then straightened out to bear upon the adjoining portion of the panel 18 so that, as hereinbefore mentioned, the end of the base portion between the remaining fingers aforesaid is forced into abutting engagement with the adjoining portion of the panel 19 to lock said device in position onto the framework. It is to be noted that in such a position, the tube receiving portion of the clamping device is supported in alignment with the openings 22 in the framework panels. Thus, as indicated by the arrow in Figure 6, the tube envelope may be readily inserted through the opening in one panel and slipped into said tube-receiving portion to be rigidly engaged thereby, as is particularly shown in Figure 2. In order to ease slipping engagement of the tube envelope with said tube-receiving or engaging portion, the latter is advantageously divided into sections by splitting the extensions 17 as shown at 28.

In view of the foregoing, it will be appreciated that an arrangement constructed in accordance with the present invention not only facilitates mounting of tubes of the general type mentioned but also makes it possible to readily remove the tube without unduly disturbing other delicate parts of the apparatus whenever the tube needs to be repaired or replaced. Moreover, the simplicity of the arrangement, and the manner in which it can be easily manufactured and assembled, render such an arrangement most suitable for use in small electronic apparatus where the space available for the mounting of vacuum tubes is restricted. Particularly, because the invention makes it possible to mount tubes with positive rigidity within the confined space afforded in small electronic apparatuses, the tubes are effectively held against vibrations to which they are subjected during normal use, and the operational efficiency of such apparatuses is thereby enhanced.

Although a particular embodiment of the invention has been described with great particularity, it is to be understood that this has been done by way of example only. Various changes in the details of construction and in the combination and arrangement of parts may be resorted to without departing from the spirit of the invention which is subject only to such limitations as are imposed by the prior art or are specifically called for in the appended claims.

I claim:

1. In an arrangement for mounting a vacuum tube provided with an electrode-enclosing envelope, framework including spaced confronting wall portions having an opening through which the tube may be introduced for positioning between said wall portions, and tube supporting means having a base portion and a tube-engaging portion, said base portion being connected with and disposed to extend between the wall portions, and said tube engaging portion being so constructed and arranged on the base portion as to engage the tube envelope when introduced between the wall portions through said opening.

2. In an arrangement for mounting a vacuum tube provided with an electrode-enclosing envelope, framework including spaced confronting wall portions having an opening providing for the introduction of the tube therebetween, a tube supporting device disposed between said wall portions and including a tube-engaging portion, and cooperative means between said wall portions of the framework and said device to effect detachable connection therebetween and to support said tube-engaging portion in position to engage the tube envelope when introduced between said wall portions through said opening.

3. In an arrangement for mounting a vacuum tube provided with an electrode-enclosing envelope, framework including spaced confronting wall portions having an opening providing for the introduction of the tube therebetween, a tube supporting device including a base portion and a tube-engaging portion disposed between opposite ends of said wall portion, and cooperative means between said wall portions of the framework and said ends of the base portion to effect a rigid connection between the framework and tube supporting device and to maintain the tube-engaging portion of the latter in position to engage the tube envelope when introduced between said wall portions through said opening.

4. In an arrangement for mounting a vacuum tube provided with an electrode-enclosing envelope, framework including spaced confronting panels, at least one panel having an opening and both panels having restricted apertures, said opening providing for the introduction of the tube between the panels, and a tube clamping device including a base portion and a tube-engaging portion, said base portion having fingers disposed for engagement with said apertures to support the tube-engaging portion in alignment with said opening for direct engagement with the tube envelope when introduced between the panels through said opening.

5. In an arrangement for mounting a vacuum tube provided with an electrode-enclosing envelope, framework including spaced confronting panels, at least one panel having an opening and both panels having restricted apertures, said opening providing for the introduction of the tube between the panels, a tube clamping device including a base portion and a tube-engaging portion, said base portion having fingers disposed for engagement with said apertures to support said tube-engaging portion in alignment with said opening for direct engagement with the tube envelope when introduced between the panels through said opening, and a tongue provided at one end of the base portion and adapted for engagement with a portion of the adjoining panel to lock said device in position between the panels.

6. In an arrangement for mounting a vacuum tube provided with an electrode-enclosing envelope, framework including spaced confronting panels, at least one of said panels having an opening therein, said opening providing for the introduction of the tube between the panels, and a tube-engaging device disposed between said panels in general alignment with said opening whereby the tube envelope may be engaged with and disengaged from said device through said opening.

7. In an arrangement for mounting a vacuum tube provided with an electrode-enclosing envelope, framework including spaced confronting panels, at least one of said panels having an opening therein, said opening providing for the introduction of the tube between the panels, and a tube clamping device including a base portion and a tube-engaging portion, said base portion having means in engagement with said panels to support the tube-engaging portion in general alignment with said opening whereby said tube envelope may be engaged with and disengaged from said engaging portion through said opening.

8. For mounting a vacuum tube on a framework including spaced confronting panels, a device comprising a base portion having end projections and side extensions, said end projections providing anchoring means for fixing the base portion on the panels to span the space therebetween, and said side extensions providing clamping means embracingly engageable with the tube to support the same between the panels.

9. For mounting a vacuum tube provided with an electrode-enclosing envelope, a device comprising a base portion, each end of said base portion having mounting means, and each side of said base portion having an extension projecting at substantially right angles to the general plane of said base portion, said extensions cooperating with each other to provide a resilient clamp for snug engagement with the tube envelope.

FREDERICK R. FARROW, Jr.

REFERENCES CITED

The following references are of record in the file of this patent:

UNITED STATES PATENTS

| Number | Name | Date |
|---|---|---|
| 1,922,047 | Hund | Aug. 15, 1933 |
| 2,100,042 | Travis | Nov. 23, 1937 |

Certificate of Correction

Patent No. 2,462,622.                                                                February 22, 1949.

FREDERICK R. FARROW, Jr.

It is hereby certified that error appears in the printed specification of the above numbered patent requiring correction as follows:

Column 4, line 68, claim 3, for the word "wall" read *base*;

and that the said Letters Patent should be read with this correction therein that the same may conform to the record of the case in the Patent Office.

Signed and sealed this 28th day of June, A. D. 1949.

[SEAL]

THOMAS F. MURPHY,
*Assistant Commissioner of Patents.*